(12) United States Patent
Murai

(10) Patent No.: US 8,189,071 B2
(45) Date of Patent: May 29, 2012

(54) IMAGING APPARATUS AND METHOD FOR SEARCHING FOR CLASSIFIED IMAGES

(75) Inventor: Akihito Murai, Osaka (JP)

(73) Assignee: Panasonic Corporation, Osaka (JP)

( * ) Notice: Subject to any disclaimer, the term of this patent is extended or adjusted under 35 U.S.C. 154(b) by 966 days.

(21) Appl. No.: 12/139,592

(22) Filed: Jun. 16, 2008

(65) Prior Publication Data

US 2009/0002522 A1 Jan. 1, 2009

(30) Foreign Application Priority Data

Jun. 14, 2007 (JP) .................................. 2007-157236

(51) Int. Cl.
*H04N 5/76* (2006.01)
*H04N 5/222* (2006.01)
(52) U.S. Cl. ............... 348/231.2; 348/231.3; 348/231.5; 348/231.7; 348/333.02
(58) Field of Classification Search ............... 348/231.2, 348/231.3
See application file for complete search history.

(56) References Cited

U.S. PATENT DOCUMENTS

| | | | | |
|---|---|---|---|---|
| 6,408,301 B1* | 6/2002 | Patton et al. | .................. | 707/741 |
| 6,629,104 B1* | 9/2003 | Parulski et al. | ............... | 382/307 |
| 6,993,184 B2* | 1/2006 | Matsugu | ...................... | 382/173 |
| 7,095,436 B2* | 8/2006 | Kato | .......................... | 348/231.2 |
| 7,415,662 B2* | 8/2008 | Rothmuller et al. | .......... | 715/200 |
| 7,539,698 B2* | 5/2009 | Sakaniwa et al. | ...................... | 1/1 |
| 7,903,882 B2* | 3/2011 | Nagasaka | ...................... | 382/224 |
| 8,010,579 B2* | 8/2011 | Metsatahti et al. | ........... | 707/805 |
| 8,036,467 B2* | 10/2011 | Matraszek et al. | ............ | 382/224 |
| 2003/0227468 A1* | 12/2003 | Takeda | .......................... | 345/619 |
| 2004/0201702 A1* | 10/2004 | White | ...................... | 348/207.99 |
| 2005/0036692 A1* | 2/2005 | Iida et al. | ...................... | 382/217 |
| 2008/0033903 A1* | 2/2008 | Carol et al. | ....................... | 707/1 |
| 2008/0189270 A1* | 8/2008 | Takimoto et al. | ................. | 707/5 |

FOREIGN PATENT DOCUMENTS

| | | |
|---|---|---|
| JP | 2002-158947 | 5/2002 |
| JP | 2003-288601 | 10/2003 |
| JP | 2007-66251 | 3/2007 |

* cited by examiner

*Primary Examiner* — Ngoc-Yen Vu
(74) *Attorney, Agent, or Firm* — Wenderoth Lind & Ponack, L.L.P.

(57) ABSTRACT

An imaging apparatus utilizes management data which includes file identification information identifying an image file recorded on a recording medium and search identification information indicating search information stored in header part of the image file identified by the file identification information. The file identification information is associated with the search identification information, and the search information is classified into predetermined categories and managed. When a category is designated, a controller referring to the management data identifies the image file related to the designated category, in the image files stored in the first or second recording medium, based on the file identification information associated with the search identification information indicating the search information that belongs to the designated category.

15 Claims, 17 Drawing Sheets

132 INDEX TABLE

| | | SHOOTING SETTING FLAG | | | | | | |
|---|---|---|---|---|---|---|---|---|
| IMAGE FILE NAME INFORMATION | SHOOTING DATE/TIME INFORMATION | PORTRAIT | NIGHT PORTRAIT | SOFT SKIN | BABY | • • • | TRAVEL DATE | MOTION PICTURE |
| P1000001. jpg | 2007.03.06.10.30 | 1 | 0 | 0 | 0 | | 0 | 0 |
| P1000003. jpg | 2007.03.06.12.15 | 0 | 1 | 0 | 0 | | 1 | 0 |
| P1000004. mov | 2007.03.06.12.35 | 0 | 0 | 0 | 0 | | 0 | 1 |
| P1000005. jpg | 2007.06.01.17.05 | (NO FLAG SET) | | | | | | |
| P1000006. jpg | 2007.06.01.17.55 | (NO FLAG SET) | | | | | | |

Fig. 4

131 CATEGORY TABLE

| CATEGORY | SHOOTING SETTING INFORMATION |
|---|---|
| PORTRAIT, ETC. | PORTRAIT, NIGHT PORTRAIT, SOFT SKIN, BABY, SELF-PORTRAIT |
| SCENERY, ETC | SCENERY, SUNSET, AERIAL PHOTO |
| NIGHT SCENERY, ETC | NIGHT SCENERY, NIGHT PORTRAIT, STARRY SKY |
| EVENT | SPORTS, PARTY, CANDLE, FIRE WORKS, BEACH, SNOW, AERIAL PHOTO |
| BABY | BABY |
| PET | PET |
| FOOD | FOOD |
| UNDERWATER | UNDERWATER |
| TRAVEL DATE | TRAVEL DATE |
| MOTION PICTURE | MOTION PICTURE/STILL PICTURE |

The SHOOTING SETTING INFORMATION column contains SCENE MODE INFORMATION.

Fig. 7

| IMAGE FILE NAME INFORMATION | SHOOTING DATE/TIME INFORMATION | SHOOTING SETTING FLAG | | | | | | |
|---|---|---|---|---|---|---|---|---|
| | | PORTRAIT | NIGHT PORTRAIT | SOFT SKIN | BABY | ⋮ | TRAVEL DATE | MOTION PICTURE |
| P1000001.jpg | 2007.03.06.10.30 | 1 | 0 | 0 | 0 | | 0 | 0 |
| P1000003.jpg | 2007.03.06.12.15 | 0 | 1 | 0 | 0 | | 1 | 0 |
| P1000004.mov | 2007.03.06.12.35 | 0 | 0 | 0 | 0 | | 0 | 1 |
| P1000005.jpg | 2007.06.01.17.05 | (NO FLAG SET) | | | | | | |
| P1000006.jpg | 2007.06.01.17.55 | (NO FLAG SET) | | | | | | |
| ••• | | | | | | | | |

132 INDEX TABLE

Fig. 12

133 READ-OUT TABLE

| SHOOTING SETTING INFORMATION | READ-OUT FLAG |
|---|---|
| PORTRAIT | 1 |
| NIGHT PORTRAIT | 0 |
| SOFT SKIN | 0 |
| BABY | 0 |
| SELF-PHOTO | 0 |
| SCENERY | 0 |
| SUNSET | 0 |
| AERIAL PHOTO | 0 |
| NIGHT SCENERY | 0 |
| STARRY SKY | 0 |
| SPORTS | 0 |
| ● | ● |
| ● | ● |
| ● | ● |
| TRAVEL DATE | 0 |
| MOTION PICTURE | 0 |

| IMAGE FILE NAME INFORMATION | SHOOTING DATE/TIME INFORMATION | SHOOTING SETTING FLAG | | | | | | |
|---|---|---|---|---|---|---|---|---|
| | | PORTRAIT | NIGHT PORTRAIT | SOFT SKIN | BABY | ⋮ | TRAVEL DATE | MOTION PICTURE |
| P1000001.jpg | 2007.03.06.10.30 | 1 | 0 | 0 | 0 | | 0 | 0 |
| P1000003.jpg | 2007.03.06.12.15 | 0 | 1 | 0 | 0 | | 1 | 0 |
| P1000004.mov | 2007.03.06.12.35 | 0 | 0 | 1 | 0 | | 0 | 1 |
| P1000005.jpg | 2007.06.01.17.05 | 0 | 0 | 0 | 1 | | 0 | 0 |
| P1000006.jpg | 2007.06.01.17.55 | | | | | | | |
| ⋮ | | | | | | | | |

132 INDEX TABLE

AFTER ADDITION

Fig. 14

Fig. 15
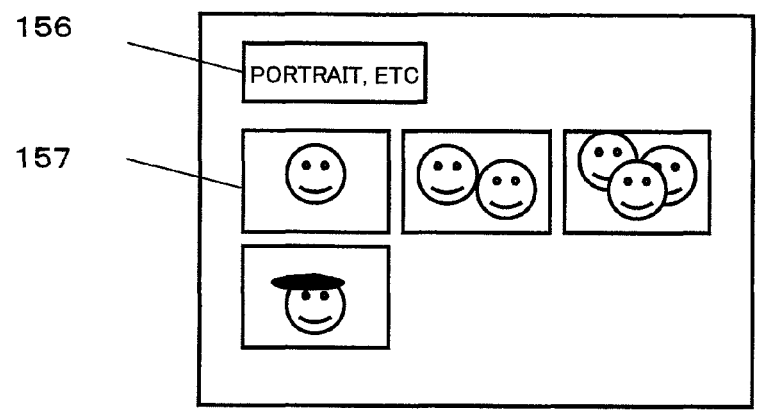
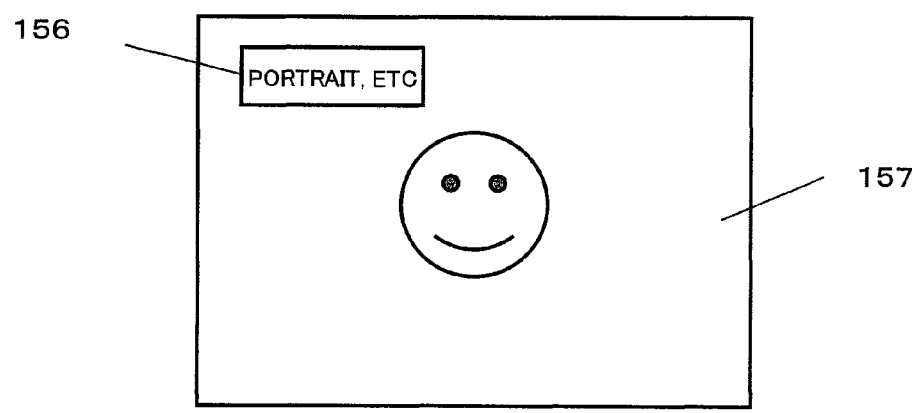
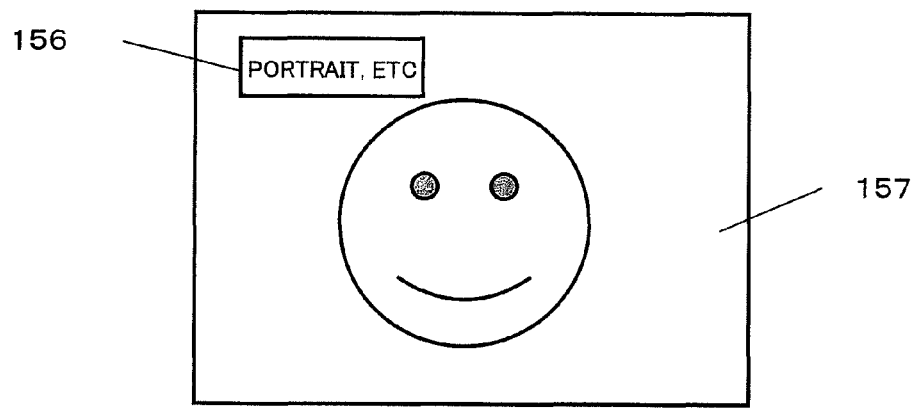

Fig. 17

| CATEGORY | SHOOTING SETTING INFORMATION |
|---|---|
| PORTRAIT, ETC. | PORTRAIT, NIGHT PORTRAIT, SOFT SKIN, BABY, SELF-PORTRAIT, i-PORTRAIT |
| SCENERY, ETC | SCENERY, SUNSET, AERIAL PHOTO, i-SCENERY |
| NIGHT SCENERY, ETC | NIGHT SCENERY, NIGHT PORTRAIT, STARRY SKY |
| EVENT | SPORTS, PARTY, CANDLE, FIRE WORKS, BEACH, SNOW, AERIAL PHOTO |
| BABY | BABY |
| PET | PET |
| FOOD | FOOD |
| UNDERWATER | UNDERWATER |
| TRAVEL DATE | TRAVEL DATE |
| MOTION PICTURE | MOTION PICTURE/STILL PICTURE |

131 CATEGORY TABLE

SCENE MODE INFORMATION (bracket covering the SHOOTING SETTING INFORMATION column)

IMAGING APPARATUS AND METHOD FOR SEARCHING FOR CLASSIFIED IMAGES

BACKGROUND OF THE INVENTION

1. Field of the Invention

The present invention relates to an imaging apparatus and an image searching method capable of classification or searching of image files.

2. Related Art

In an imaging apparatus such as a digital camera, an image which is shot is generally recorded in a recording medium such as a memory card. An image recorded in the recording medium can be played back on the imaging apparatus. In recent years, capacity of a recording medium is increased year by year, and large quantity of image data can be stored in one recording medium. When a user views the image data shot by the imaging apparatus, it takes longer time to find out a desired image as the number of pieces of recoded image data is increased, resulting in poor usability. Accordingly, a function of easily and speedily searching for and classifying an image is required for the imaging apparatus.

JP-A-2003-288601 discloses an imaging apparatus capable of recording information effective for search and classification with the recording information related to an image. The information regarding a moving object existing in the image can be taken as an example of the information effective for search and classification. A header part of the image file may be an example of a location which stores the information effective for search and classification. This arrangement allows the search and classification to be done with high accuracy, and data processing such as search and browsing to be efficiently performed.

However, if it is configured to read the image file or at least the header part of the image file in each time image classification or image search to retrieve the search information included in the header, it takes much time, resulting in inconvenience.

Meanwhile, it can be considered that a table, and so on should be generated for associating the information for identifying the image file with search information upon generation of the image file. However, a processing ability of a CPU is required for generating such a table, thus involving a problem that creation of the image file is delayed.

An object of the present invention is to provide the imaging apparatus capable of easily and speedily retrieving and classifying an image file with good operability. Further, another object of the present invention is to provide the imaging apparatus capable of classifying and searching for the image file with good operability, with no delay generated in generating the image file.

SUMMARY OF THE INVENTION

A first aspect of the invention provides an imaging apparatus including: an operation unit that inputs information regarding an operation of a user; an imaging unit that images a subject to generate image data; a file generation unit that generates an image file by adding, to the generated image data, a header part which can include at least one of plural pieces of search information capable of being used for search of the image data; a recording unit that records the generated image file to a first or second recording medium; and a controller that controls generation and update of management data for managing the image file recorded in the first or second recording medium. The first recording medium is a removable recording medium, and the second recording medium stores the management data. The management data includes file identification information for identifying the image file stored in the first or second recording medium, and search identification information indicating the search information stored in the header part of the image file identified by the file identification information, while associating the file identification information with the search identification information. The controller classifies the search information into predetermined categories and manages the classified search information. When a category is designated on the operation unit, the controller referring to the management data identifies the image file related to the designated category, in the image files stored in the first or second recording medium, based on the file identification information associated with the search identification information indicating the search information that belongs to the designated category.

A second aspect of the invention provides an imaging apparatus including: an operation unit that inputs information regarding an operation of a user; an imaging unit that images a subject to generate image data; a file generation unit that generates an image file by adding, to the generated image data, header part which can include at least one of plural pieces of search information capable of being used for search of the image data; a recording unit that records the generated image file to a first or second recording medium; and a controller that controls generation and update of management data for managing the image file recorded in the first or second recording medium.

At a timing of generating the image file by the file generation unit, the controller adds the file identification information for the generated image file to the management data, but does not add, to the management data, the search identification information indicating the search information regarding at least one piece of the search information that can be stored during generation of the image file in the header part of the image file.

At a timing different from the timing of generating the image file by the file generation unit, the controller reads out the image file or the header part of the image file from the first or second recording medium, and adds, to the management data, the search identification information indicating the at least one of piece of search information when the at least one piece of search information is stored in the header part of the image file.

A third aspect of the invention provides an image search method for searching a recording medium for an image file generated by an imaging apparatus which images a subject to generate an image file and records the image file in the recording medium.

According to the method, file identification information and search identification information are stored to management data with the file identification information associated with the search identification information. The file identification information identifies the image file recorded in the recording medium. The search identification information indicates search information stored in a header part of the image file identified by the file identification information. The search information is classified into predetermined categories and managed. Designation of a category as a search target is received. With reference to the management data, the image file related to the designation of a category is identified in the image files stored in the first or second recording medium, based on the file identification information associated with the search identification information indicating the search information that belongs to the designated category.

A fourth aspect of the invention provides an image search method for searching a recording medium for an image file generated by an imaging apparatus which images a subject to generate an image file and records the image file in the recording medium.

According to the method, file identification information and search identification information are stored to management data with the file identification information associated with the search identification information. The file identification information identifies the image file recorded in the recording medium. The search identification information indicates search information stored in a header part of the image file identified by the file identification information.

At a timing of generating the image file by the file generation unit, the file identification information for the generated image file is added to the management data, while the search identification information indicating the search information regarding at least one piece of the search information that can be stored during generation of the image file in the header part of the image is not added to the management data.

At a timing different from the timing of generating the image file by the file generation unit, the image file or the header part of the image file is reading out from the first or second recording medium, and the search identification information indicating the at least one of piece of search information when the at least one piece of search information is stored in the header part of the image file is added to the management data.

According to the present invention, the image is classified into a category so as to be searchable, easy and speedy search and classification of the shot image can be realized. In addition, according to the present invention, the search identification information used in image search during generating the image file is not added to the management data. Thus, it is possible to classify and search for the image file without delay in generating the image file, with good operability.

BRIEF DESCRIPTION OF DRAWINGS

FIG. 4 is a view indicating a structure of a category table.

FIG. 7 is a view indicating the structure of an index table;

FIG. 12 is a view indicating a structure of a read-out table.

FIG. 14 is a view indicating a structure of an index table.

FIG. 15 is a view indicating a screen image during playback operation.

FIG. 17 is a view indicating a structure of the category table which classifies scene modes automatically set.

DETAIL DESCRIPTION OF THE INVENTION

Preferred embodiments of the present invention are explained below with reference to the appended drawings.

1 Structure 1-1 Backside of Digital Camera

Figure 1:
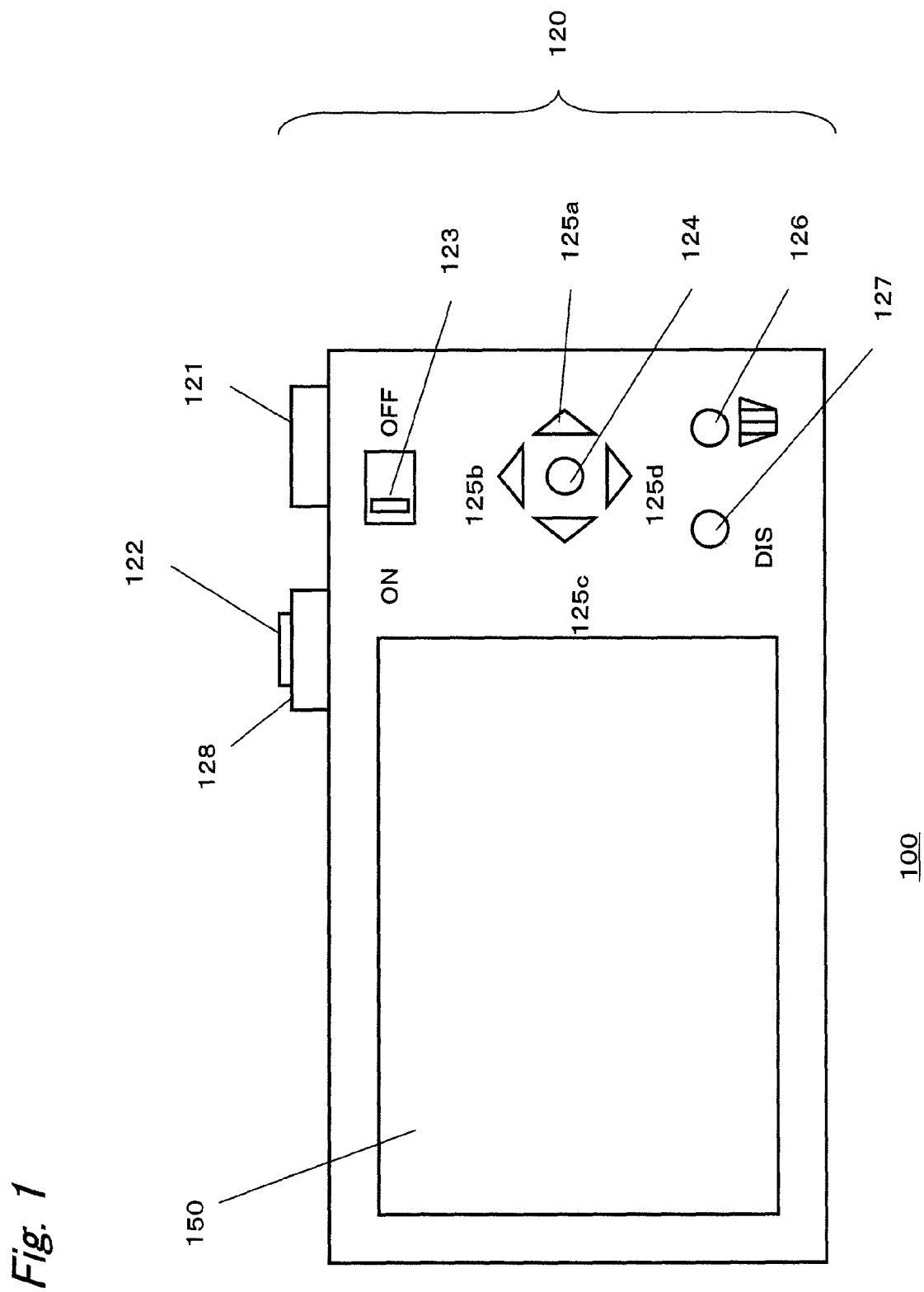
FIG. 1 is a backside view of a digital camera according to an embodiment of the present invention.

FIG. 1 is a backside view of a digital camera 100 according to an embodiment 1 of the present invention. A liquid crystal display (LCD) monitor 150 and an operation section 120 are disposed on the backside of the digital camera 100. The operation section 120 includes a mode dial 121 and various buttons 122, . . . .

The mode dial 121 is an operation dial for changing a control mode of the digital camera 100. A user rotating the mode dial 121 can set the digital camera 100, for example, in a playback mode or a shooting mode. In addition, a scene mode as will be described later can be set.

A shutter button 122 can be operated by pressing it by a user. When the shutter button 122 is pressed, the digital camera 100 generates and records a still image. A power switch 123 is a part of the operation section for switching on and off a power supply of the digital camera 100.

A set button (or a menu button) 124 is a button for deciding a setting in the digital camera 100. By pressing the set button 124 by the user, the digital camera 100 displays a menu screen in the LCD monitor 150.

Direction keys 125a to 125d are a part of the operation section for moving a cursor and changing display of the screen image to the next or previous screen image. A deletion button 126 is a button to be pressed for deleting the recorded image file. A display button 127 is a button for changing a display pattern, such as a guide line, on the LCD monitor 150.

1-2 Electrical Structure of Digital Camera

Figure 2:
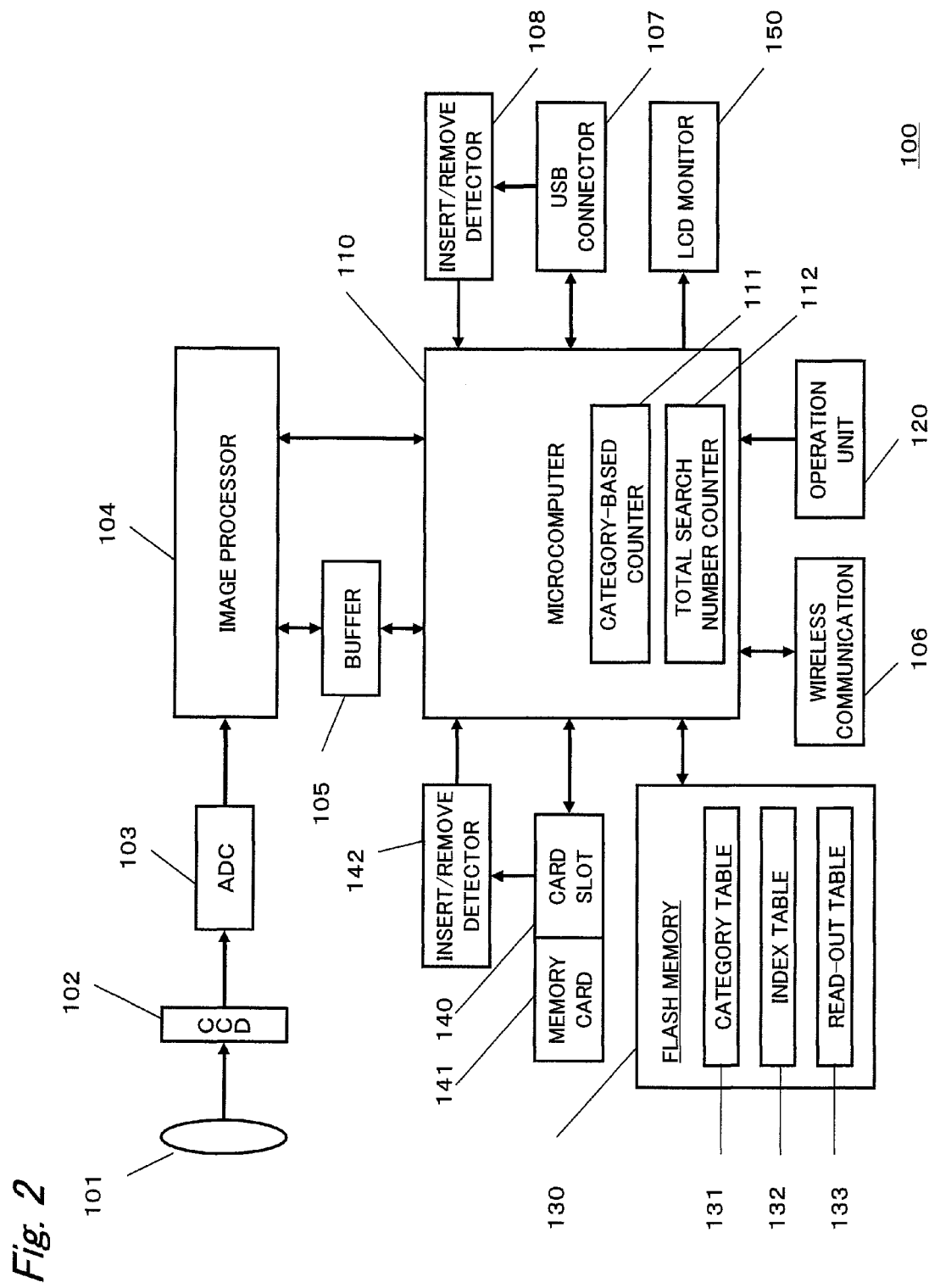
FIG. 2 is a block diagram indicating a structure of the digital camera according to an embodiment of the present invention.

FIG. 2 is a block diagram indicating the structure of the digital camera 100 according to the embodiment of the present invention. An optical system 101 collects an optical signal from a subject and forms a subject image on a CCD image sensor 102. The CCD image sensor 102 images the formed subject image and generates an analogue signal of the image. An AD converter 103 converts the analogue signal of the image created by the CCD image sensor into image data of a digital signal. An image processor 104 applies various kinds of image processing to the image data inputted from the AD converter 103. Specifically, the image processor 104 applies to the inputted image data, gamma conversion processing and white balance correction processing, YC conversion processing, electronic zoom processing, compression processing, decompression processing, and so on. However, it is not necessary to apply all of such processing. In processing the image by the image processor 104, a buffer 105 is used as a work memory.

The image data subjected to image processing by the image processor 104 is transmitted to a microcomputer 110. Then, the microcomputer 110 adds header part to the image data to generate the image file. In this embodiment, the microcomputer 110 generates an image file compliant with Exif (Exchangeable image file format) format. However, an image format to which the present invention can be applied is not limited to the Exif format. The present invention can be applied to an image file format having a header part which can store information for searching for an image. The header part can store image shooting setting information used for searching for the image data.

The microcomputer 110 includes a category-based counter 111 and a total search number counter 112 inside. These counters are described later.

The operation section 120 receives a command from a user. The microcomputer 110 controls entirely the digital camera 100 in accordance with the command transferred from the operation section 120.

A flash memory 130 can store various kinds of information required for controlling the microcomputer 110. The flash memory 130 stores a category table 131, an index table 132, and a read-out table 133, as an example of various kinds of information. In addition, the flash memory 130 can store an image file generated in the microcomputer 110. The index table 132 is data for managing the image files recorded in a memory card 141. Creation and update of the index table 132 are controlled by the microcomputer 110.

The memory card 141 which is a removable recording medium is mechanically and electrically inserted or connected to a card slot 140. The card slot 140 records the data in the memory card 141 and reads out the data from the memory card 141, in accordance with the command of the microcomputer 110.

An insert/remove detector 142 monitors a state in that the memory card 141 is removed from the card slot 140. When the memory card 141 is removed, the insert/remove detector 142 notifies the microcomputer 110 of the remove of the memory card 141. The insert/remove detector 142 is supplied with a power supply different from the power supply for the main body of the digital camera 100. Therefore the insert/remove detector 142 can monitor the remove of the memory card 141 even when the power supply for the main body of the digital camera 100 is turned OFF. At the time of remove of the memory card 141 while the power supply for the main body of the digital camera 100 is OFF, the insert/remove detector 142 stores information on a fact that the memory card 141 is removed. When the power supply for the main body of the digital camera 100 is turned ON, the insert/remove detector 142 notifies the microcomputer 110 of the fact that the memory card 141 is removed while the power supply is OFF.

The LCD monitor 150 can display an image represented by the image data which is generated by the image processor 104 applying predetermined image-processing to an image signal created by the CCD image sensor 102. The LCD monitor 150 can also display an image represented by the image data which is generated by the image processor 104 applying predetermined image-processing to the image data read out from the memory card 141. In addition, the LCD monitor 150 can also display various kinds of settings of the digital camera 100.

1-3 Structure of Recording Area of Flash Memory

Figure 3:
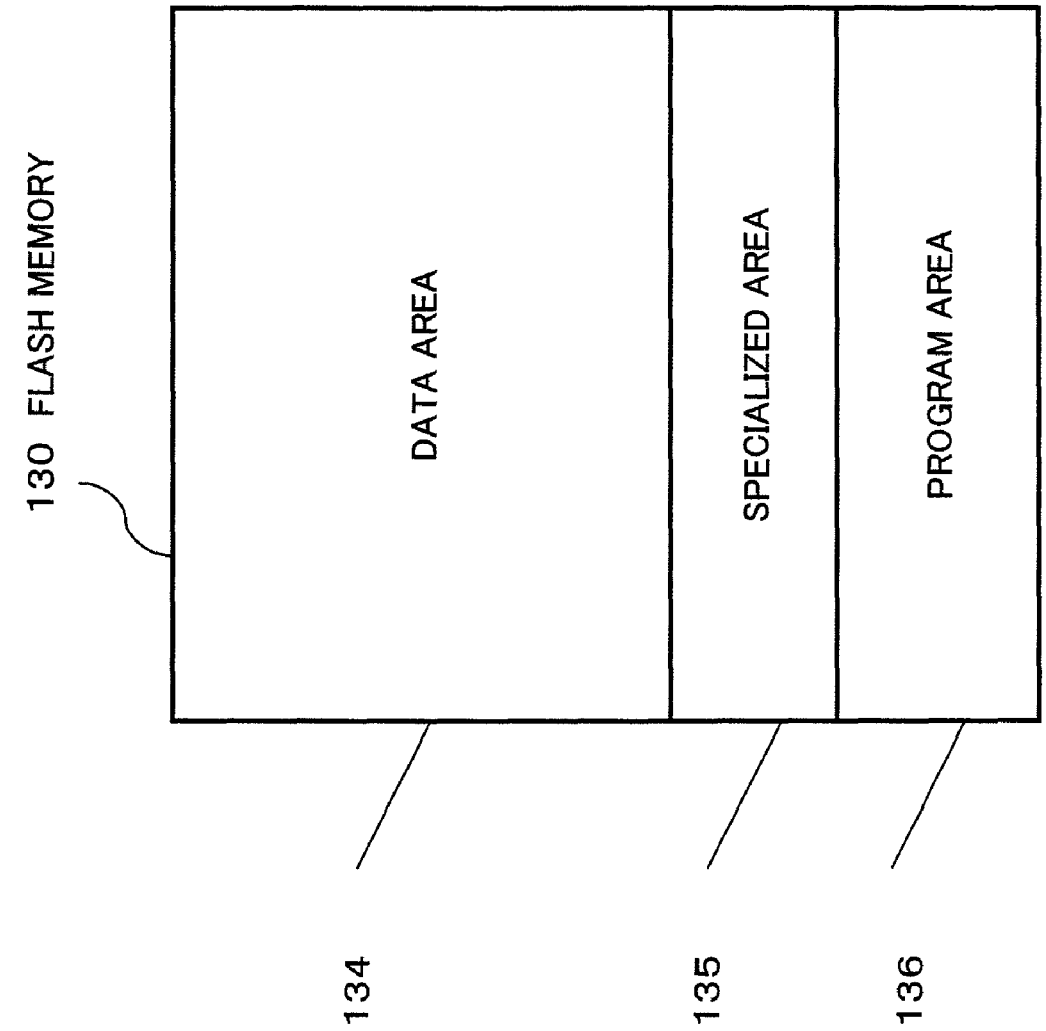
FIG. 3 is a schematic view indicating a configuration of a recording area of a flash memory.

FIG. 3 shows the structure of the recording area of the flash memory 130. As shown in FIG. 3, the recording area of the flash memory 130 is divided into a data area 134, a specialized area 135, and a program area 136. The category table 131 and the read-out table 133 are stored in the data area 134. When the image file is stored in the flash memory 130, the image file is stored in the data area 134. The specialized area 135 is an area for storing the index table 132. The program area 136 is an area for storing a program executed by the microcomputer 110.

1-4 Structure of Category Table

FIG. 4 shows the structure of the category table 131. As shown in FIG. 4, the category table 131 is a table relating the category to the shooting setting information.

The shooting setting information is information indicating the setting regarding a shooting operation for generating the image data, and is stored in the header part of the image file and used for search. The category is information designated by the user upon search of the image file. By designating one or a plurality of categories by the user, it is possible to extract the image file of which header part stores shooting setting information included in the designated category. The category table 131 shows the shooting setting information that belongs to each category. By referring to the category table 131, the microcomputer 110 can recognize a relation between the category and the shooting setting information. The shooting setting information includes information regarding a scene mode setting such as "portrait", "scenery", "underwater" (scene mode information), information regarding "travel date", and the information regarding "moving picture/still picture".

The scene mode means the shooting setting mode for taking a picture in the digital camera 100. When the digital camera 100 executes the shooting operation after the scene mode is set by the user operating the operation section 120 such as a mode dial 121, it is possible to take a picture suitable for the scene corresponding to the scene mode. For example, when taking a picture (image) of the sunset scene, if the shooting operation is performed by the digital camera 100 with the scene mode of the "sunset" selected, it is possible to obtain the picture (image) of the sunset scene taken beautifully. This is because one set of the shooting setting conditions capable of photographing the scene of the sunset beautifully is previously stored in the flash memory 130 and the microcomputer 110, and the stored set of the shooting setting conditions can be selected by selecting "sunset" as the scene mode. The shooting setting conditions are combination of conditions, such as a shutter speed, ISO sensitivity, an aperture value, and a white balance correction.

The "travel date" means elapsed number of days from the first date of the travel. For example, the information such as "the first day", "the second day", and "the last day" is stored in the header part of the image file. This travel date information can be obtained by calculating the elapsed time from the first day of the travel to the present time. The present date can be confirmed by a timer inside the digital camera 100. Meanwhile, the information regarding the first date of the travel is previously set, for example, in the flash memory 130.

The "motion picture/still picture" is information indicating whether or not the image file is a motion picture, and this information is added to the header part when the image file of motion picture is created.

As shown in FIG. 4, for some pieces of shooting setting information, a plurality of pieces of shooting setting information are collected in one category. For example, five pieces of shooting setting information such as "portrait", "night portrait", "soft skin", "baby", "self-portrait" are collected in one category of "portrait, etc". Such shooting setting information indicates the scene mode for taking a portrait, and therefore such shooting setting information is classified into the category of "portrait". Regarding "scenery, etc", "night scenery, etc", and "event" also, a plurality of pieces of shooting setting information are collected in one category. Accordingly, the microcomputer 110 can recognize the plurality of pieces of shooting setting information that can be collected in one category by referring to the category table 131. To the contrary, one piece of shooting setting information is assigned to one category such as "baby" and "pet".

In addition, shooting setting information belonging to a certain category and also belonging to a different category may be prepared. In this embodiment also, the shooting setting information "night portrait" simultaneously belongs to the category of the "portrait, etc" and the "night scenery, etc". Further, the shooting setting information "baby" simultaneously belongs to the category of the "portrait, etc" and the "baby". Thus, by storing such shooting setting information in the header part of the image file, the image file can be retrieved from a plurality of viewpoints (categories). For example, when the shooting setting information of "night portrait" is stored in the header part of a certain image file, designation of the category of the "portrait, etc" allows the image file to be retrieved, and also designation of the category of the "night scenery, etc" allows the image file to be retrieved.

1-5 Correspondence of Elements Between the Embodiment and the Present Invention

The combination of the optical system 101, the CCD image sensor 102, the AD converter 103, and the image processor 104 is an example of the imaging unit of the present invention. The microcomputer 110 is an example of the file generation unit of the present invention. The memory card 141 is an example of the first recording medium of the present invention. The combination of the card slot 140 and the microcomputer 110 is an example of the recording unit of the present invention. The index table 132 is an example of the management data of the present invention. The flash memory 130 is an example of the second recording medium of the present invention. The microcomputer 110 is an example of the controller of the present invention. The combination of the operation section 120 and the LCD monitor 150 is an example of the operation unit of the present invention. The LCD monitor 150 is an example of the display unit of the present invention. The image file name information is an example of the file identification information of the present invention. The shooting setting information is an example of the search information of the present invention. The shooting setting flag is an example of the search identification information of the present invention. The DPOF (Digital Print Order Format) file is an example of the playback control file of the present invention.

2 Operation

The operation of the digital camera 100 configured as described above is explained below. Particularly, recording operation and category playback operation are described hereunder. In the explanation for the recording operation, the structure of the image file and the structure of the index table are also explained. In the explanation for the category playback operation, addition of the shooting setting flag and the structure of the DPOF file are also explained.

2-1 Recording Operation

Figure 5:
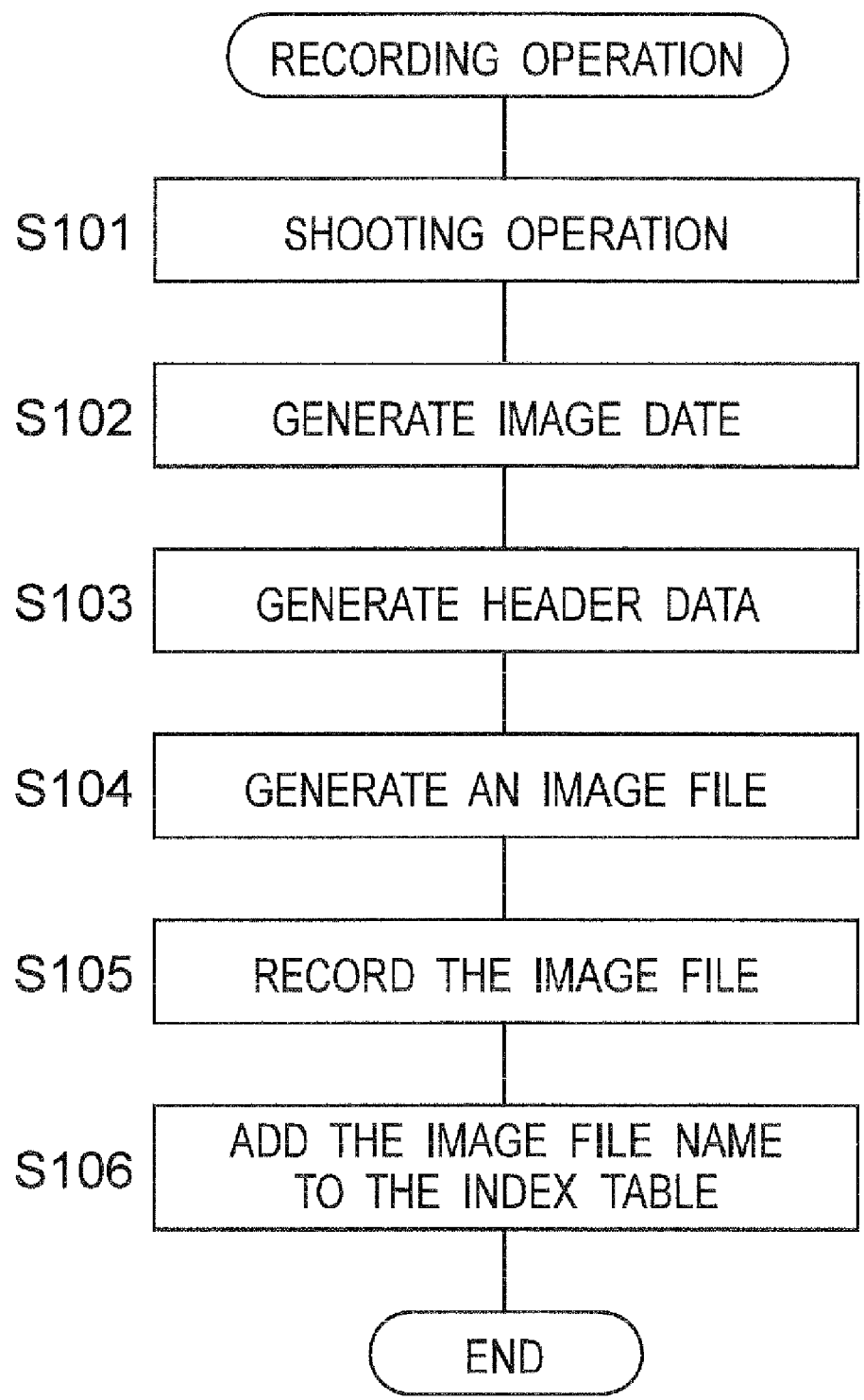
FIG. 5 is a flowchart of a recording operation of the digital camera according to the embodiment of the present invention.

FIG. 5 is a flowchart of the recording operation of the digital camera 100. With reference to the drawing, the recording operation of the digital camera 100 is explained.

The user operates the mode dial 121 to select the shooting mode. At this time, the scene mode may be selected. When the shutter button 122 is pressed, the CCD image sensor 102 images the subject image collected by the optical system 101 (S101) to generate the image data (S102). At this time, the shooting operation is performed by adjusting the shutter speed and the aperture value according to the previously set shooting setting condition.

The image data thus generated is digitized by the AD converter 103, which is then subjected to image processing in the image processor 104, resulting in the JPEG-compressed image data. At this time, thumbnail image data is also created.

In parallel to the generation of the image data, the microcomputer 110 generates header part (S103). Various kinds of information for shooting are stored in the header part. For example, The various kinds of information include shooting date and time information, scene mode information, shutter speed, aperture value, and so on. In addition, the thumbnail image is also stored in the header part.

Figure 6:
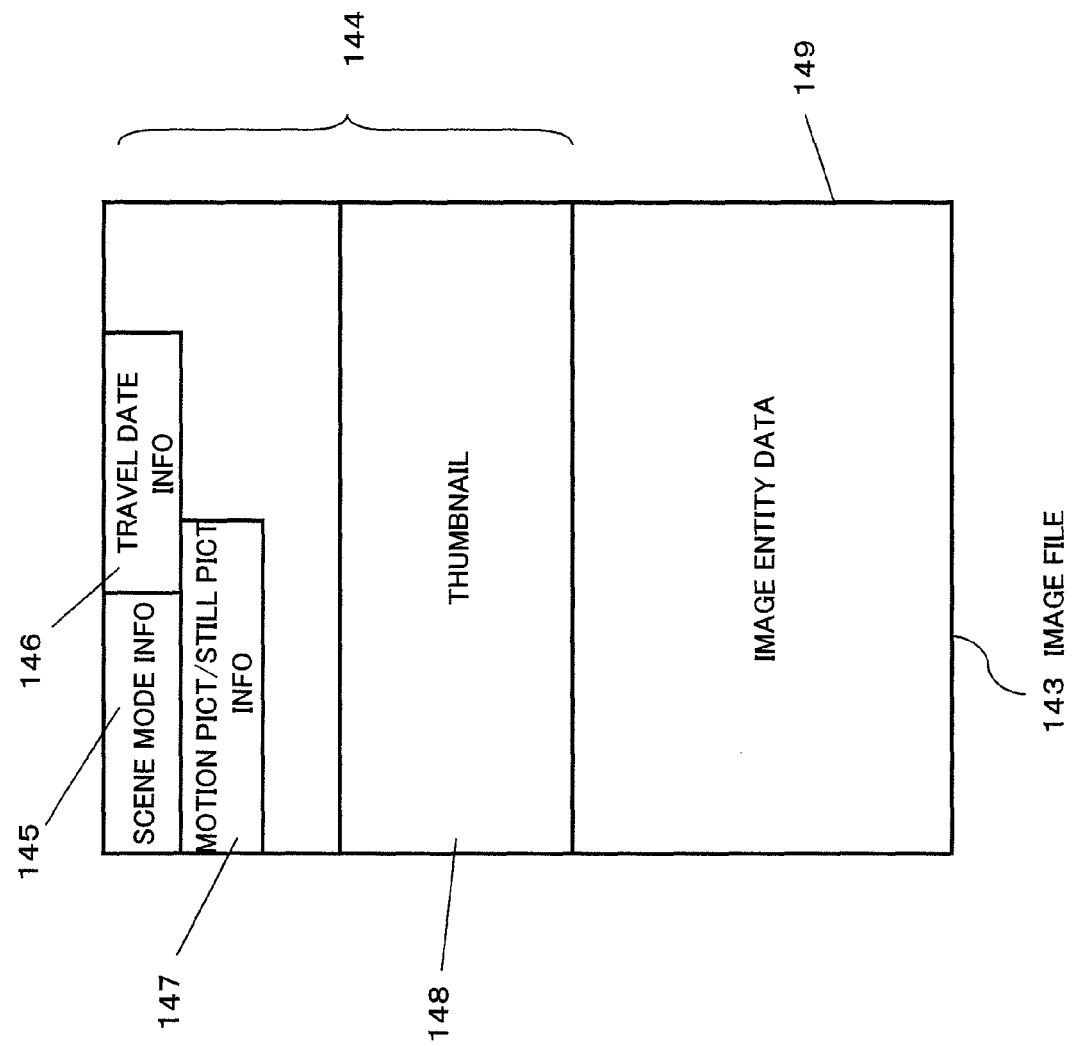
FIG. 6 is a schematic view indicating a data structure of an image file.

The header part is added to the image data generated as described above to generate the image file (S104). As a result, the structure of the image file is as shown in FIG. 6. The image file 143 includes a header part 144 and an image entity data 149. The header part 144 includes a data area which stores various kinds of information and a data area which stores a thumbnail 148. The various kinds of information include scene mode information 145, travel date information 146, motion picture/still picture information 147, and so on. The scene mode information 145 is information which is stored in the header part 144 when the shooting is performed with the scene mode being set. For example, when the shooting is performed in a "baby" mode, the information of "baby" is stored. To the contrary, when the shooting is performed without setting the scene mode, the header part 144 is not changed maintained to be a default value. Thus, the microcomputer 110 can recognize a state that the scene mode is not set during shooting by reading out the header part 144.

The image file 143 thus generated is recorded in the memory card 141 (S105). Next, the image file name information of the image file 143 is added to the index table 132 (S106). FIG. 7 is a schematic view indicating the structure of the index table 132. The index table 132 is management data for managing image files recorded in the memory card 141. The index table 132 manages image file name information for identifying the image file recorded in the memory card 141, and shooting setting flags indicating the shooting setting information stored in the header part of the image file identified by the image file name information, while relating the image file name information with the shooting setting flags.

The microcomputer 110 controls the creation and update of the index table 132. The microcomputer 110 adds the image file name information to the index table 132 when the image file is recorded in the memory card 141, and deletes the image file name information from the index table 132 when the image file is deleted from the memory card 141. Then, when the image file name information is added to the index table 132, the microcomputer 110 adds the information regarding the image file such as shooting date and time, in association with its image file name information. Thus, the microcomputer 110 can identify the image file stored in the memory card 141, without reading out from the memory card 141 the image file or the header part of the image file. Therefore, high speed processing such as playback of the image file can be achieved. Note that FIG. 7 shows only the shooting date and time information and the shooting setting flag, as the information regarding the image file name information. However, actually other information may also be recorded in association with the shooting setting flag.

In addition, the index table 132 is cleared under the control of the microcomputer 110 when the memory card 141 is removed from the card slot 140. Specifically, when the memory card 141 is removed from the card slot 140, the insert/remove detector 142 detects the remove of the memory card 141 mechanically or electrically, and informs the microcomputer 110 of the remove of the memory card 141. When detecting the remove of the memory card 141 during a power-off of the digital camera 100, the insert/remove detector 142 informs the microcomputer 110 of the remove of the memory card 141 when the digital camera 100 is powered on next time. Upon receiving the information, the microcomputer 110 clears the index table 132 stored in the flash memory 130. Specifically, the image file name information stored therein is deleted, and each kind of information associated with the image file name information is also deleted. The reason for clearing the index table 132 when the memory card 141 is removed is as follows. A case of replacing the memory card 141 by another memory card is considered. In such a case, contents stored in the index table 132 and contents stored in another memory card are not matched with each other. Therefore the index table 132 is not useful as the management data of the image file in another memory card.

The shooting setting flag is information indicating the shooting setting information which is stored in the header part 144 of the image file 143. The shooting setting flag has the number of bits which is equal to the number of pieces of the shooting setting information. Each bit corresponds to each shooting setting information in advance. For example, the first bit corresponds to "portrait" mode, and the next bit corresponds to "night portrait". Each bit is set to "0" or "1". The shooting setting information corresponding to the bit which is set to be "1" is stored in the header part of the image file indicated by the image file name information. Note that the shooting setting flag can be added to the index table, for each piece of shooting setting information.

In step S106 of FIG. 5, namely, at a timing of generating the image file by the microcomputer 110, the microcomputer 110 adds the image file name information for identifying the generated image file to the index table 132 stored in the flash memory 130.

However, at the timing of generating the image file, the microcomputer 110 does not add, to the index table 132, the shooting setting flag regarding at least one of all pieces of shooting setting information that can be stored in the header part of its image file (irrespective of a state whether or not the at least one of all pieces of shooting setting information is included in the header part). In this manner, at the timing of generating the image file, the shooting setting flag is not described. This allows update processing of the index table 132 to be performed speedily. Therefore, extra load is not imposed on the microcomputer 110 at the timing of generating the image file, thus making it possible to speedily create the image data or image file. Accordingly, the time required for the shooting processing can be made shorter.

Here, the timing of generating the image file by the microcomputer 110 may be the same timing as the timing of generating the recording image file. Namely, it may be the time when the image file is generated or may be a stage before generating the image file. Also, it may be the time after storing the image file in the memory card 141. In short, it may be the timing not largely different from the timing of generating the image file in a common-sense range.

In addition, regarding the shooting date and time information, the index table 132 may be added at the timing of generating the image file. In this embodiment, the scene mode information, the information indicating existence/non-existence of the travel date information, and the motion picture/still picture information are not added to the index table 132, at the timing of generating the image file.

As described later, the microcomputer 110 reads out the image file or the header part of the image file from the memory card 141 at a timing different from the timing of generating the image file by the microcomputer 110, and adds the shooting setting flag indicating shooting setting information to the index table 132 when the shooting setting information is stored in the header part of the image file.

As described above, in the recording operation, the microcomputer 110 can perform generation processing of the image file and update processing of the index table 132. However, at this timing, the microcomputer 110 does not add, to the index table 132, the shooting setting flag indicating the scene mode information, the information indicating the existence/non-existence of the travel date information, and the motion picture/still picture information.

2-2 Category Playback Operation

The digital camera 100 of this embodiment manages the image files stored in the memory card 141 by classifying them for each category and enables the image file which belongs to the category designated by the user to be played back. Such an operation is called "category playback operation".

Figure 8:
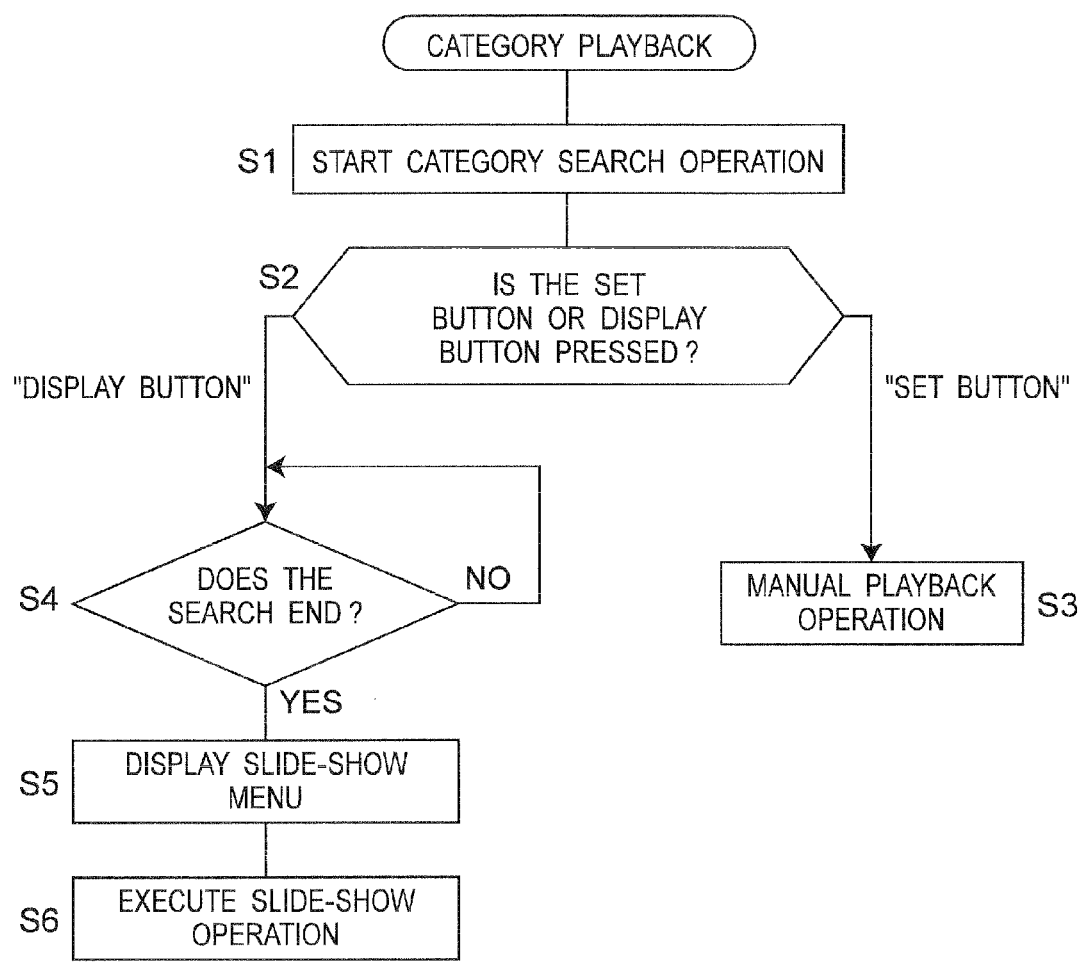
FIG. 8 is a flowchart of a category playback operation of the digital camera according to the embodiment of the present invention.

FIG. 8 is a flowchart of the category playback operation of the digital camera 100. With reference to the drawing the category playback operation is explained.

The category playback operation can be largely divided into a category search operation (S1) and a playback operation (S3). In addition, a slide-show operation can also be executed (S6).

2-2-1 Category Search Operation

The category search operation is an operation in which the microcomputer 110 reads out the image file or the header part of the image file from the memory card 141, and when the shooting setting information is stored in the header part of the image file, adds the shooting setting flag indicating the shooting setting information stored in the header part of this image file to the index table 132 associating the shooting setting flag with the image file.

The category search operation is started from a playback menu. FIG. 9A shows an example of the playback menu. In FIG. 9A, when a right direction key 125*a* is pressed, the category search operation is started (step S1 of FIG. 8).

Figure 9B:
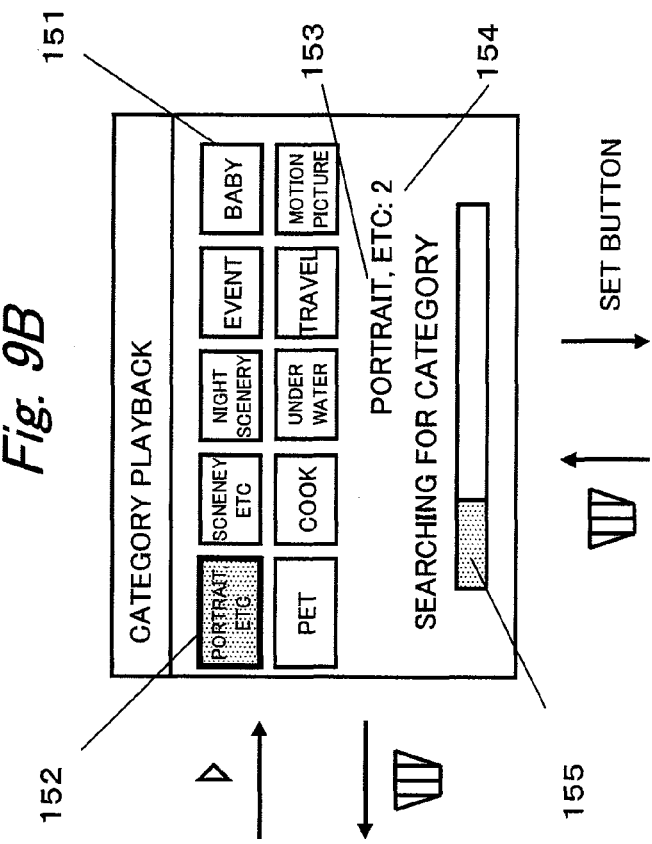
FIGS. 9A to 9C are views indicating screen images for category search operation.
Figure 9A:
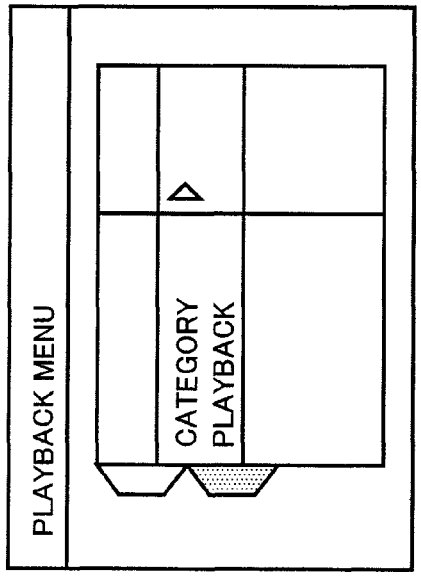

When the category search operation is started, the screen image shown in FIG. 9B is displayed. FIG. 9B shows the screen image of the LCD monitor 150 during searching for category. In this screen image, a category icon 151 is displayed for each of all categories. A frame of the category icon 151 (frame 152 in FIG. 9B) for either one of the categories is displayed thick. The thick frame 152 is referred to as "cursor indication". The cursor indication 152 can be moved vertically and horizontally by operating the direction keys 125. A target category indication 153 displays a name of the category corresponding to the category icon indicated by the cursor indication 152. In FIG. 9B, the category indication 153 shows "portrait, etc", and this means that the cursor indication 152 shows the category icon corresponding to the category of the "portrait, etc". A searched image number indication 154 shows the number of image files that belongs to the category indicated by the cursor indication 152 and has been found. Specifically, the microcomputer 110 determines how many image files belonging to the category indicated by the cursor indication 152 are registered in the index table 132, and counts the image files belonging to the category with a category-based counter 111. The category-based counter 111 is prepared for each category, by which the number of image files can be recognized for each category in real time. A value shown by the searched image number indication 154 is increased according to a searching state during the category search.

Figure 9C:
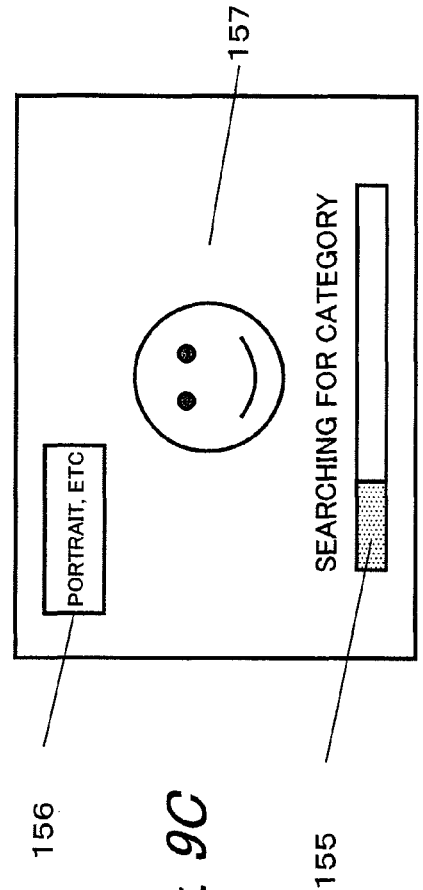

When the set button 124 is pressed during category search, the operation is shifted to a manual playback operation, and the screen image shown in FIG. 9C is displayed in the LCD monitor 150 (S3). Namely, when the set button 124 is pressed during category search, the microcomputer 110 reads out from the memory card 141 the image file belonging to the category shown by the category icon 151 designated by the cursor indication 152. The image processor 104 applies predetermined image processing to the image data stored in the read-out image file, and generates the image data for display.

The LCD monitor 150 displays the image based on the image data for display. An example of the screen image at this time is shown in FIG. 9C. A progress bar display 155 and a category display 156 are displayed in OSD (On Screen Display), while superposed on a display image 157. In the image display during category search, displaying the progress bar indication 155 can inform the user of a progress state of the category search. In addition, displaying the category indication 156 can inform the user which categories the image file shown by the displayed image 157 belongs to.

In addition, in the screen image shown in FIG. 9A, when a right direction key 125a is pressed, the screen image is shifted to that shown in FIG. 9B. In the screen image shown in FIG. 9B, when the deletion button 126 is pressed, the processing is returned to the screen image shown in FIG. 9A. Also, in the screen image shown in FIG. 9B, when the set button 124 is pressed, the screen image is shifted to that shown in FIG. 9C. In the screen image shown in FIG. 9C, when the deletion button 126 is pressed, the screen image is returned to the screen image shown in FIG. 9B.

Figure 10A:
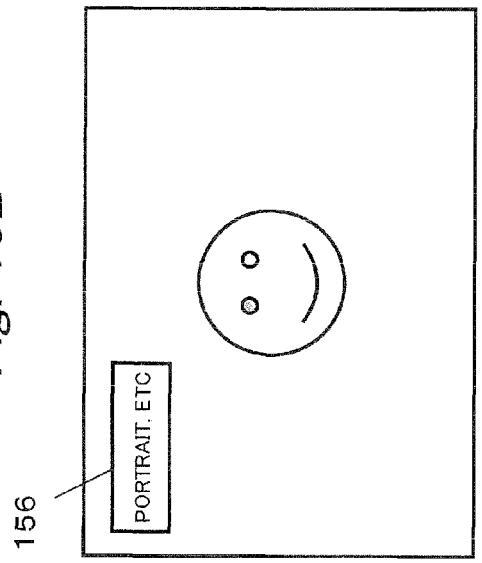
FIGS. 10A to 10C are views indicating the screen images after ending the category search operation.

Meanwhile, in step S2 of FIG. 8, when the display button 127 is pressed, the operation regarding the slide-show is started. However, the operation regarding the slide-show is started after completion of the category search (S4). Namely, when the category search is completed, the screen image of FIG. 10A is displayed. In this case, the progress bar indication 155 is not displayed. In this state, when the display button 127 is further pressed, the screen image is shifted to that shown in FIG. 10C (S5).

Figure 10B:
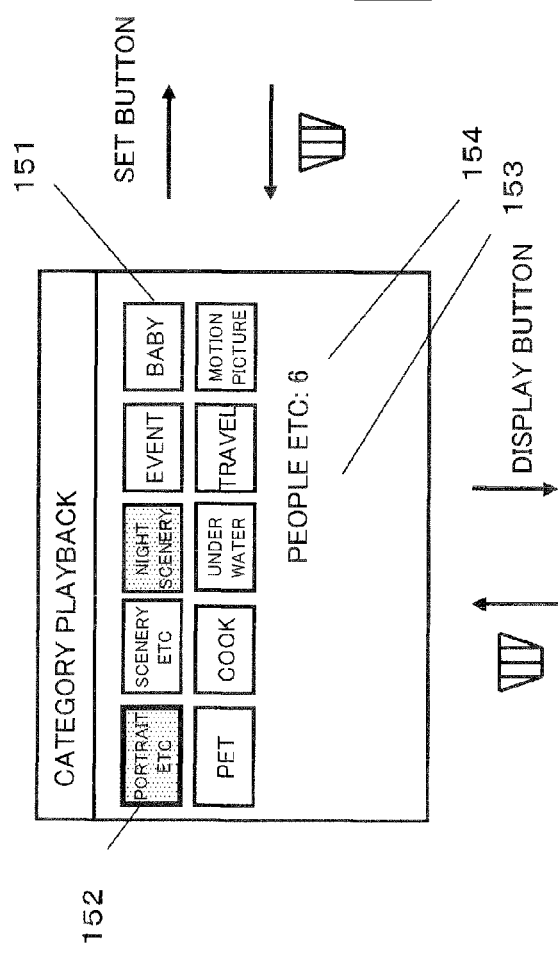
Figure 10C:
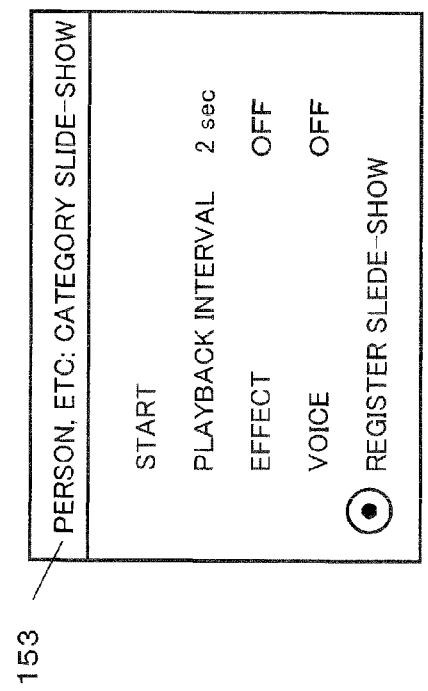

FIG. 10C is a view indicating a setting screen of a category slide-show. The category slide-show means a slide-show for the image files belonging to the selected category after the category search. On the screen image of FIG. 10C, a start-up operation (S6) of the category slide-show and a registration operation of the category slide-show are possible. These operations are described later. Note that FIG. 10B is a view indicating a screen image displaying an image after completion of the category search.

Figure 11:
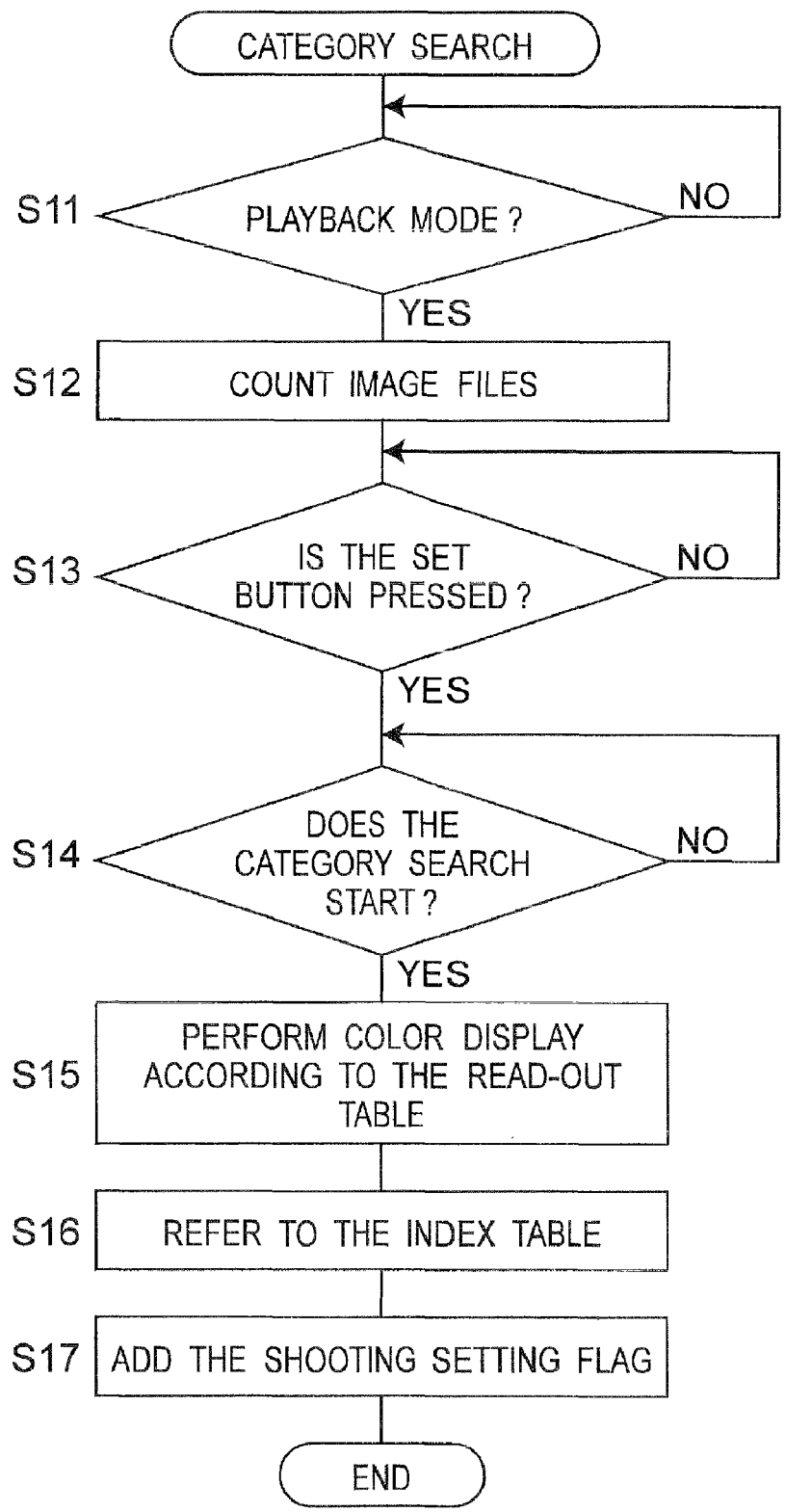
FIG. 11 is a flowchart of the category search operation of the digital camera according to the embodiment of the present invention.

Next, details of the category search operation is explained, with reference to FIG. 11. FIG. 11 shows a flowchart of the category search operation.

First, the microcomputer 110 monitors whether or not the mode dial 121 is set in a playback mode (S11). When the mode dial 121 is set in the playback mode, the microcomputer 110 counts all image files stored in the memory card 141 (S12). For example, the microcomputer 110 refers to FAT stored in the memory card 141 and counts the image files.

Next, the microcomputer 110 monitors whether or not the set button 124 is pressed (S13). When the set button 124 is pressed, a screen image shown in FIG. 9A is displayed in the LCD monitor 150. In this state, the microcomputer 110 monitors whether or not the right direction key 125a is pressed (S14).

When the right direction key 125a is pressed, the microcomputer 110 starts the category search. First, the microcomputer 110 reads out and refers to a read-out table 133 from the flash memory 130 (S15). FIG. 12 shows an example of the read-out table 133. The read-out table 133 indicates whether or not the shooting setting flag is already set in the index table 132, regarding each of all pieces of shooting setting information. FIG. 12 shows an example in which the image file taken (shot) in the "portrait" mode is already registered in the index table 132.

The microcomputer 110 reads out from the read-out table 133 the shooting setting information of which read-out flag shows "1". Then, the microcomputer 110 refers to the category table 131, and recognizes which one of the categories, the shooting setting information with the read-out flag indicating "1" belongs to. For example, when the read-out flag of the "portrait" mode shows "1", the microcomputer 110 recognizes that a "portrait, etc" category is already registered in the index table 132. Then, regarding the category already registered in the index table 132, the microcomputer 110 changes display of the category icon 151 shown in FIG. 9B from a gray scale display to a color display (S15).

Namely, the microcomputer 110 differentiates a displaying manner of the category indication 151 for the category, between a category including at least one piece of shooting setting information of which shooting setting flag is already registered (set) in the index table 132, and a category including no shooting setting information of which shooting setting flag is registered (set) in the index table 132.

This can also be said as follows. While reading out the image file or the header part of the image file from the memory card 141 and adding the shooting setting flag to the index table 132, at a timing different from the timing of generating the image file by the microcomputer 110, and when a state of the category is changed, the microcomputer 110 performs control as follows. Namely, when the state of a certain category is changed from a state in which no one of shooting setting flags indicating the shooting setting information belonging to the certain category is described in the index table 132, to a state in which any one of the image setting flags indicating the shooting setting information belonging to the certain category is described in the index table 132, the displaying manner of the category indication 151 for the category is changed during a period of adding the shooting setting flag.

Next, the microcomputer 110 refers to the index table 132, and examines whether or not there is the image file name information which no shooting setting flag thereto is associated with the index table 132 (S16). Then, regarding the image file name information which no shooting setting flag is associated with the index table, the shooting setting flag is added to the index table 132 (S17).

Figure 13:
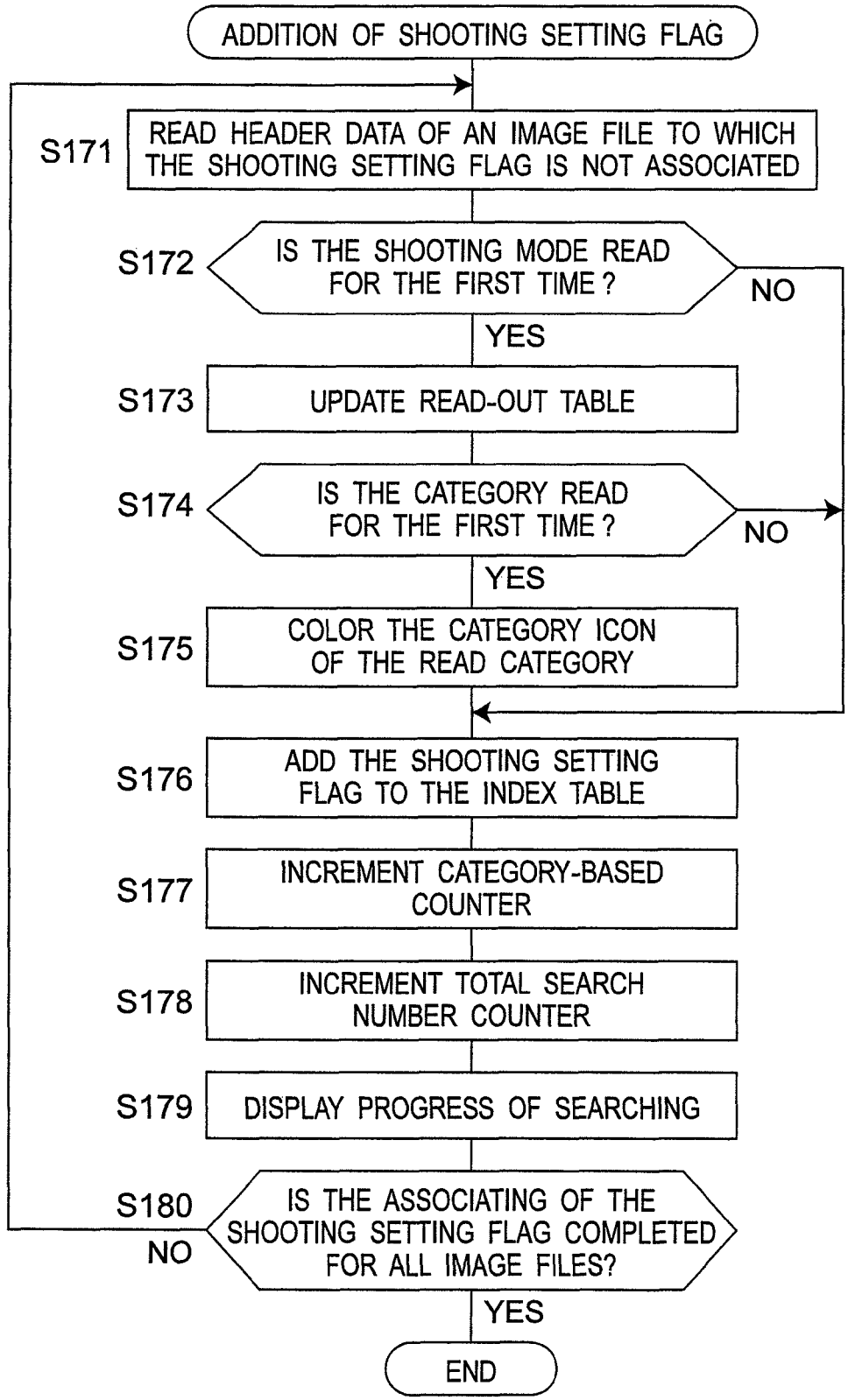
FIG. 13 is a flowchart of adding a shooting setting flag of the digital camera according to the embodiment of the present invention.

Addition processing (step S17) of the shooting setting flag in the flow of FIG. 11 is explained in detail below. FIG. 13 is a flowchart for explaining the operation of the digital camera 100 in the addition processing (step S17) of the shooting setting flag.

The microcomputer 110 reads out from the memory card 141 the header part of the image file indicated by the image file name information with which the shooting setting flag has not been associated yet. When the shooting setting information is included in the header part, the microcomputer 110 reads out the shooting setting information (S171). When the shooting setting information is read out from the header part, the microcomputer 110 judges whether or not the shooting setting information read out from the header part is the shooting setting information read out for the first time, by referring to the read-out table 133 (S172). When the shooting setting information read out from the header part is the shooting setting information read out for the first time, the read-out flag associated with the read shooting setting information is set to be "1" (S173) in the read-out table 133.

Next, the microcomputer 110 refers to the category table 131 and the read-out table 133, and examines whether or not the category to which the shooting setting information read out belongs is the category read out for the first time (S174). When the category to which the shooting setting information read out belongs is the category read out for the first time, the microcomputer 110 controls the LCD monitor 150 to change display of the category icon 151 corresponding to the category from gray scale display to color display (S175). Thereafter, the microcomputer 110 proceeds the processing to step S176.

Meanwhile, in step S172, when the shooting setting information read out from the header part is not the information read out for the first time, the microcomputer 110 skips the processing from step S173 to step S175 to advance the processing to step S176. In addition, in step S174, when the category read out from the header part is not the category read out for the first time, the step S175 is skipped and the processing is advanced to step S176.

In step S176, the microcomputer 110 adds to the index table 132 the shooting setting flag associated with the image file of which header part is read out. Thus, the index table 132 shown in FIG. 7 becomes a table as shown in FIG. 14.

Next, the microcomputer 110 increments the category-based counter 111 with respect to the category to which the image file of which header part is read out belongs (S177). Thus, image files classified for each category can be counted. Note that the image file already registered in the index table 132 when the category search is started is counted previously by the category-based counter 111. When the incrementing the category-based counter 111 is finished, the searched image number indication 154 is updated to increase by one in the screen image shown in FIGS. 9A to 9C, in case of that the index table 132 corresponds to the category at which the cursor indication 152 locates.

Next, the microcomputer 110 increments the total search number counter 112 by one (S178). Thus, it is possible to count all of image files to which category search is already finished. Then, the microcomputer 110 calculates a progress degree of the category search based on known number of image files in the memory card 141 and a value of the total search number counter 112, and updates the progress bar display 155 (S179).

Finally, the microcomputer 110 confirms whether or not the shooting setting flags are associated with all image files registered in the index table 132 (S180). When the associating is done to all image files, the category search operation is finished. When the associating is not done to all image files, the processing is returned to step S171, and the aforementioned processing is repeated until the associating to all the image files is finished.

2-2-2 Playback Operation

Next, the operation after the category search operation is explained. When the category search operation is finished, the screen image shown in FIG. 10A is displayed. On this screen image, a plurality of pieces of shooting setting information are collected and can be selected in one category. The selection can be realized with a function of combination of the microcomputer 110, the operation section 120, and the LCD monitor 150. When the user designates one of the categories that can be selected and presses the set button 124, the display is switched to the screen image shown in FIG. 10B, enabling a manual playback operation (S3).

In the manual playback operation, as shown in FIG. 15, plural image playback and enlarged playback are possible in addition to normal one image playback. The user can switch a playback mode by operating a zoom ring 128 to a wide angle direction (W) or telephoto direction (T). The microcomputer 110 sequentially refers to the index table 132 and the category table 131 according to a forward or reverse feeding operation of the user, and searches for the image file to be reproduced. Then, according to the search result, the image file is read out from the memory card 141, which is then subjected to predetermined processing in the image processor 104 and is displayed in the LCD monitor 150.

More specifically, when the user designates the playback of the next image file, the microcomputer 110 recognizes the selected category, and specifies the shooting setting information that belongs to the category by referring to the category table 131. Then, the microcomputer 110 refers to the index table 132, and searches for the image file of which shooting setting flag associated with the specified shooting setting information shows "1". The microcomputer 110 reads out the searched image file form the memory card 141. Namely, the microcomputer 110 reads out from the memory card 141 the image file shown by the image file name information associated, in the index table 132, with the shooting setting flag indicating the shooting setting information included in the selected category, and performs control so that the image data stored in the read-out image file or image data obtained by applying predetermined processing to the stored image data is displayed in the LCD monitor 150.

2-2-3 Slide-Show Operation

In a state of the screen image shown in FIG. 10A, when the user presses the display button 127, a setting screen image of a category slide-show shown in FIG. 10C is displayed. In FIG. 10C, "playback interval" is information indicating a playback time per image in the slide-show and can be changed by the operation of the user. "Effect" is a special effect during image display. For example, setting of gradually displaying an image from a center or setting of displaying an image from a side of the screen image can be considered. "Voice" is the setting regarding whether or not the voice is presented during the slide-show. "Slide-show registration" is described later.

The slide-show operation is started by "Start". In the slide-show operation, the aforementioned playback operation is repeated, while updating the image file to be reproduced one after another.

2-2-4 Slide-Show Registration

Next, the slide-show registration is explained. When the "slide-show registration" is selected, a control file for automatically playing back the category selected at that time is created. As such a control file, for example, a control file defined by a DPOF standard is considered.

Figure 16:
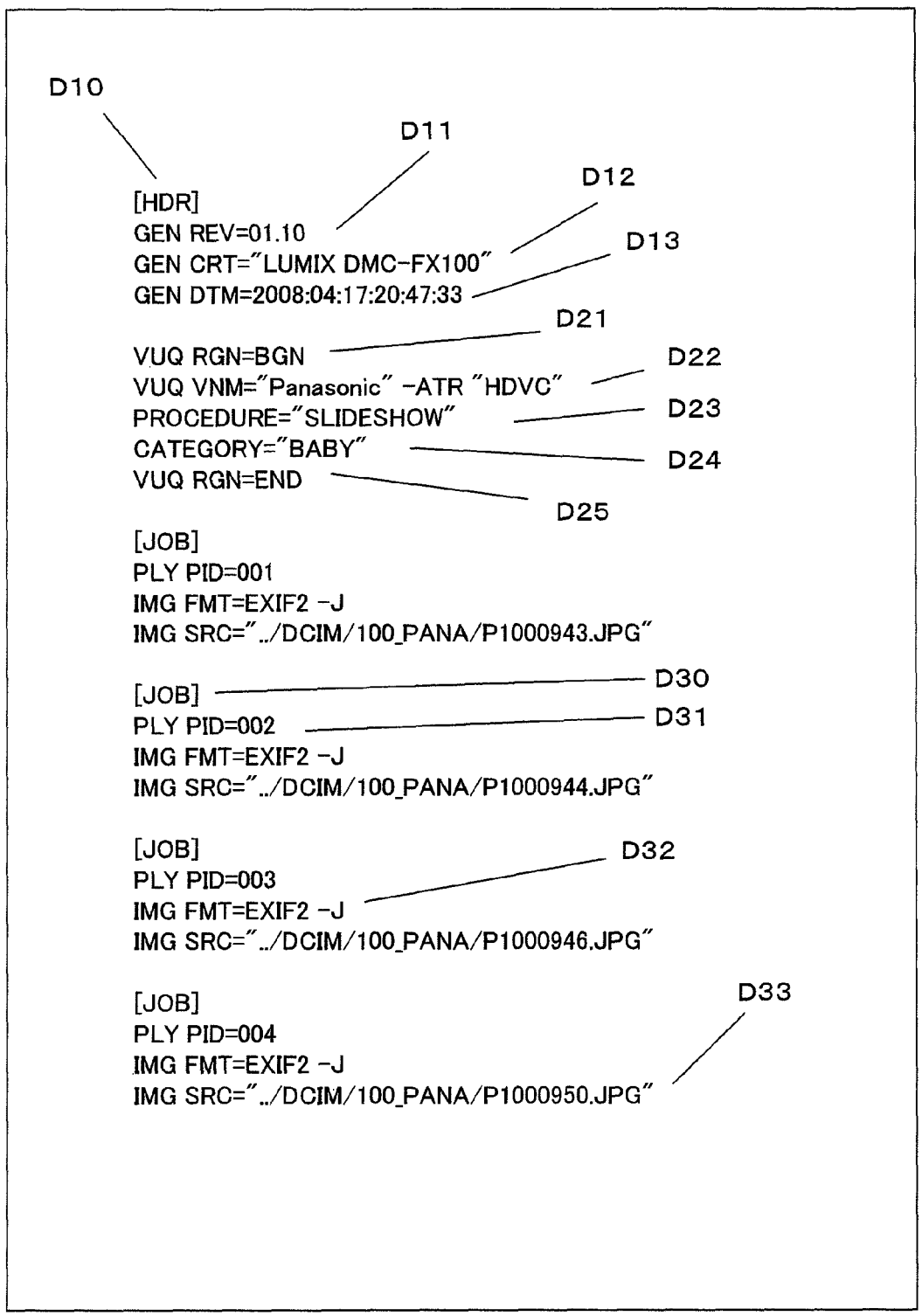
FIG. 16 is a view indicating an example of a DPOF file.

FIG. 16 shows an example of the DPOF file for the category slide-show. The DPOF file includes a header part, a vendor unique part and a job definition part. In the DPOF file, the header part, the vendor unique part, and the job definition part are sequentially described in this order.

The header part starts from a header identifier D10 and includes DPOF version information D11, camera information D12, and creation date and time information D13. The DPOF version information D11 is information indicating which version of the DPOF standard is based to create the DPOF file. The camera information D12 is information for identifying a camera that generates the DPOF file. The creation date and time information D13 is information indicating the date and time of generating the DPOF file.

The vendor unique part starts from a vendor unique start identifier D21 and ends with a vendor unique end identifier D25. The meaning or arrangement of the information included in the vendor unique part can be defined by a camera manufacturer uniquely. Accordingly, the meaning of the vendor unique part included in the DPOF file created by a camera of one camera manufacturer may not be recognized by a camera of the other camera manufacturer in some cases. However, regarding the vendor unique part, a common arrangement may be made among different camera manufacturers.

In a case of the DPOF file for the category slide-show, the vendor unique part preferably includes vendor information D22, application information D23, and category information D24. The vendor information D22 is information indicating a camera manufacturer. The application information D23 is information indicating that the present DPOF file is used in the slide-show. The category information D24 is information indicating category to which the image file to be displayed in slide-show belongs. In the DPOF file shown in FIG. 16, "BABY" is shown. From this, it is found that the DPOF file is provided for the category slide-show regarding the category of a baby.

The job definition part includes one or a plurality of jobs. Each job starts from a job identifier D30. Each job includes job ID (D31) for identifying the job and file format information D32 and file identification information D33. The file identification information D33 is information for identifying the image file to be automatically played back in the slid show. The file identification information D33 preferably includes a file name of the image file and also preferably includes information regarding a path of the image file. The microcomputer 110 decides which image file has the file identification information D33 to be included in the DPOF file, by referring to the category table 131 and the index table 132. Specifically, when the user selects the slide-show registration, the microcomputer 110 recognizes the selected category, and identifies the shooting setting information that belongs to the category by referring to the category table 131. Then, the microcomputer 110 refers to the index table 132, and searches for the image file of which shooting setting flag associated with the identified shooting setting information shows "1". The microcomputer 110 adds to the DPOF file the file identification information D33 regarding the searched image file.

The microcomputer 110 stores the created DPOF file in the memory card 141. Consequently the memory card 141 stores the DPOF file together with the image file. Therefore, it enables the category slide-show operation in the digital camera 100 and further enables the category slide-show operation in the other device by inserting the memory card 141 into other device. However, the other device inserted with the memory card 141 must be provided with hardware and software for achieving the category slide-show.

As described above, the DPOF file for slide-show with respect to image files belonging to one category can be automatically created. More specifically, the DPOF file for slide-show is created by using the index table 132, and therefore the DPOF file for slide-show can be easily created. Namely, regarding the category designated by the user, the microcomputer 110 decides the file identification information stored in the DPOF file by referring to the index table 132. Therefore, the category-based DPOF file can be automatically created only by designating the category by the user.

Further, preferably the image file name information stored in the index table 132 is utilized as the file identification information of the DPOF file. When the image file name information stored in the index table 132 is utilized, it is not necessary to read out the header part of the image file again during generation of the DPOF file, thus making it possible to speedily create the DPOF file.

3 Summary of the Present Embodiment

As described above, the digital camera 100 according to the embodiment stores the index table 132. The index table 132 manages the image file name information and the shooting setting flag, in association with each other. During generation of the image file, the microcomputer 110 adds the image file name information to the index table 132. At that time, the microcomputer 110 does not add to the index table 132 at least one of all pieces of the shooting setting information that can be stored in the header part of the image file, irrespective of whether or not such at least one piece of shooting setting information is included in the header part.

Thus, at a timing of generating the image file, it is possible to omit addition of at least one piece of shooting setting information to the index table 132, thus making it possible to reduce a processing load of the microcomputer 110. Therefore, the microcomputer 110 can speedily generate the image file or update the index table 132.

In addition, in the digital camera 100 of the embodiment, when at least one piece of shooting setting information is stored in the header part of the image file, the microcomputer 110 adds to the index table 132 the shooting setting flag indicating the shooting setting information, at a timing different from the timing of generating the image file.

Thus, the shooting setting flag can be added to the index table 132, without delaying the generation of the image file. When there is a case that the image file is speedily generated like a continuous shooting, it is preferable to avoid delay in generating the image file due to addition of the shooting setting flag to the index table 132.

In addition, according to the present invention, the search information can be the shooting setting information, as shown in the embodiment. Thus, the images file of a similar shooting scene can be easily picked up.

In addition, according to the present invention, a plurality of pieces of search information can be collected and can be selected in one category, as shown in the embodiment. In this case, the microcomputer 110 performs control to read out from the memory card 141 the image file shown by the image file name information associated in the index table 132 with the shooting setting flag indicating the shooting setting information included in the selected category, and to display on the LCD monitor 150 the image based on the image data stored in the read-out image file or image data obtained by applying predetermined processing to the read-out image data.

Thus, the image file of a similar search condition can be read out by a single operation, resulting in good operability.

In addition, as shown in this embodiment, according to the present invention, at least one piece of search information belonging to one category may belong to another category. Thus, the image file to which one piece of search information is assigned can be retrieved from various viewpoints (categories), resulting in easy retrieval.

In addition as shown in this embodiment, according to the present invention, a displaying manner of the category indication 151 may be differentiated between a case that any one of the shooting setting flags indicating the shooting setting information belonging to the category is described in the index table 132, and a case that no one of the shooting setting flags indicating the shooting setting information belonging to the category is described in the index table 132. In this manner, the displaying manner becomes different between display of category which has an image file classified into the category, and display of category which does not have such an image file. This makes it easy to discriminate and recognize between both displays.

In addition, as shown in this embodiment, according to the present invention, the image file or the header part of the image file may be read out from the memory card 141, at a timing different from the timing of generating the image file. Then, during a period in which the shooting setting flag is added to the index table 132 and when the state of a certain category is changed from one state in which no one of the shooting setting flags indicating the shooting setting information belonging to the category is described in the index table 132, to the other state in which any one of the shooting setting flags is described in the index table 132, the displaying manner of the category indication 151 indicating that category may be changed in a period of adding the shooting setting flag. Thus, during the category search, one category including the image file and the other category not including the image file can be easily discriminated and recognized.

In addition, as shown in the embodiment, according to the present invention, the DPOF file for the category slide-show may be created based on the index table 132. Thus, the DPOF file for the category slide-show can be easily created.

Specifically, as shown in the embodiment, the information (file identification information, and so on) to be stored in the DPOF may be acquired based on the index table 132. Thus, by referring to the index table 132, the image file associated with target shooting setting information can be speedily identified. Therefore, the image file identification information to be included in the DPOF file can also be speedily decided. Accordingly, the DPOF file can be speedily created by referring to the index table 132.

In addition, as shown in the embodiment, the image file name information described in the index table 132 may be used as the file identification information to be included in the DPOF file. In this case, the image file name information may be processed as needed. The image file name information described in the index table 132 is used as the file identification information of the DPOF file, and therefore the DPOF file can be speedily created.

4 Other Embodiments

In the above-described embodiments, a specific aspect of the present invention has been explained. However, concept of the present invention is not limited to the aforementioned examples. Other embodiments are explained below.

In the above-described embodiments, the CCD image sensor 102 is given as an example of the imaging unit of the present invention. However, the imaging unit is not limited thereto. For example, a CMOS image sensor and an NMOS image sensor may be used as the imaging unit. Namely, one capable of imaging a subject image and generating image data can be utilized as the imaging unit.

In the above-described embodiment, the shooting setting information is shown as an example of the search information of the present invention. However, the search information is not limited thereto. For example, the shutter speed and a shooting place may be used as the search information. Namely, information that can be used for retrieving the image data can be used for the search information. However, when using the shooting setting information as the search information, the image file can be retrieved based on a condition for shooting a picture. Therefore, the image file of the similar shooting scene can be easily picked up.

In the above-described embodiments, the Exif format is given as an example of the file format of the present invention. However, the file format is not limited thereto. Namely, the file format may be any format of image file including additional data.

In the above-described embodiment, the memory card 141 is given as an example of the recording medium of the present invention. However, the recording medium is not limited thereto. For example, an embedded memory may be used as the recording medium. Namely, the recording medium may be one capable of storing created image files.

In the above-described embodiment, the index table 132 is given as an example of the management data of the present invention. However, the management data is not limited thereto. Namely, the management data may be one for managing image files recorded in the recording medium.

In the above-described embodiment, the microcomputer 110 is given as an example of the controller of the present invention. However, the controller is not limited thereto. For example, a semiconductor circuit constituted of only hardware may be used as the controller. Namely, the controller may be one capable of performing control of creation and update of the management data.

In the above-described embodiment, the shooting setting flag is given as an example of the search identification information of the present invention. However, the search identification information is not limited thereto. For example, as the search identification information, information such as English character, and so on, indicating the shooting setting information may be used. Namely, one capable of indicating the search information may be used.

In the above-described embodiment, the LCD monitor 150 is given as an example of the display unit of the present invention. However, the display unit is not limited thereto. For example, as the display unit, an organic EL display, and so on may be used. Namely, the display unit capable of displaying the image based on the image data may be used.

In the above-described embodiment, the display is made easier to discriminate, by making the display of the category indication in color display or gray scale display. However, the present invention is not limited thereto. For example, in one case the category indication may be displayed, and in the other case the category indication may not be displayed. In addition, in one case the category indication may be displayed normally, and in the other case the category indication may be displayed in a semi-transparent display. Moreover, luminance of both cases may be different. Namely, the displays in both cases may be discriminated visually.

In addition, in the above-described embodiment, the searched image is displayed in the LCD monitor 150 during the category playback operation. However, the present invention is not limited thereto. For example, the searched image data may be outputted to the external display device via a wireless communication unit 106 or a USB connector 107.

In addition, in the above-described embodiment, the DPOF file is stored in the memory card 141. However, the present invention is not limited thereto. For example, the DPOF file may be transmitted to the external device via the wireless communication unit 106 or the USB connector 107. In this case, by transmitting the DPOF file together with image files, the category slide-show operation can be automatically performed in the external device.

In addition, in the above-described embodiment, the scene mode is set manually by the user with the mode dial 121. However, the microcomputer 110 may set automatically a suitable scene mode according to a photographic circumstance based on the information regarding the image and the subject. For example, when it is determined that a human face is included in the image, the scene mode is set to "portrait". Focus information (positional information of a zoom lens and a focus lens) is given as the information regarding the subject. A distance to the subject is judged based on the positional information of the zoom lens and focus lens, and according to the distance the mode can be switched to the scene mode of "macro" and "scenery". Note that the name of the scene mode automatically set may be made discriminated from that of the scene mode manually set. For example, the scene mode may be named "i-portrait", "i-macro", and "i-scenery". In this case, the category of the automatically set scene mode may be newly provided. In addition, the automatically set scene mode may be classified into the same category as the corresponding manually set scene mode (see FIG. 17).

The present invention can be applied to the imaging apparatus capable of classifying or retrieving the image file. Specifically, the present invention can be applied to a digital still camera, a digital video camera, and a cellular phone with a camera function.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2007-157236, filed on Jun. 14, 2007, which is expressly incorporated herein by reference in its entirety.

What is claimed is:

1. An imaging apparatus, comprising:
an operation unit that inputs information regarding an operation of a user;
an imaging unit that images a subject to generate image data;
a file generation unit that generates an image file by adding, to the generated image data, a header part with at least one of plural pieces of search information for searching of the image data, the search information indicating one of first conditions, the search information including information indicating a shooting setting for the imaging apparatus for shooting an image via a shooting unit and generating the image data;
a recording unit that records generated image files to a first or a second recording medium; and
a controller that controls a generation and an update of management data for managing the image files recorded on the first or the second recording medium,
wherein the first recording medium is a removable recording medium, and the second recording medium stores the management data,
the management data includes file identification information for identifying the image files stored in the first or the second recording medium, and search identification information indicating the search information stored in the header part of each of the image files identified by the file identification information, while associating the file identification information with the search identification information,
the controller classifies the search information into predetermined categories based on second conditions and manages the classified search information, and
when a category is designated on the operation unit, the controller referring to the management data identifies an image file related to the designated category among the image files stored in the first or the second recording medium, based on the file identification information associated with the search identification information indicating the search information that belongs to the designated category.

2. The imaging apparatus according to claim 1, wherein the shooting setting is set manually by a user via the operation unit, or automatically set by the control unit, and the search information regarding the automatically set shooting setting and the search information regarding the manually set shooting setting are classified into the same category.

3. The imaging apparatus according to claim 1, wherein
at a timing of generating the image file by the file generation unit, the controller adds the file identification information for the generated image file to the management data, but does not add, to the management data, the search identification information indicating the search information regarding at least one piece of the search information that is stored during generation of the image file in the header part of the image file, and
at a timing different from the timing of generating the image file by the file generation unit, the controller reads out the image file or the header part of the image file from the first or the second recording medium, and adds, to the management data, the search identification information indicating the at least one piece of search information when the at least one piece of search information is stored in the header part of the image file.

4. The imaging apparatus according to claim 3, wherein
at the timing different from the timing of generating the image file in the file generation unit, the controller changes a display manner of a category indication indicating the category in a period in which the search identification information is added, when a state of a category is changed from one state in which no piece of the search identification information indicating the search information belonging to the category is described in the management data, to another state in which any one piece of the search identification information indicating the search information belonging to the category is described in the management data, and during a period in which the image file or the header part of the image file is read out from the first or the second recording medium and search identification information is added to the management data.

5. The imaging apparatus according to claim 1, wherein the controller manages a plurality of different categories, and the search information belongs to two or more categories.

6. The imaging apparatus according to claim 5, wherein the controller controls a display unit to display a category indication indicating each category, and the controller differentiates a displaying manner of the category indication for the category, between one category including at least one piece of search information of which search identification information is already recorded in the management data and the another category including no search information of which search identification information is recorded in the management data.

7. The imaging apparatus according to claim 6, wherein the controller controls the display unit to display in color the category indication of the category including at least one piece of search information of which search identification information is recorded in the management data, and display in gray the category indication of the category including no search information of which search identification information is recorded in the management data.

8. The imaging apparatus according to claim 1, wherein the controller referring to the management data generates a playback control file used for playback control of the image file belonging to a category designated in the operation unit, and stores the playback control file in the first or the second recording medium.

9. The imaging apparatus according to claim 1, wherein the plural pieces of search information and the predetermined categories are preset in the imaging apparatus.

10. An imaging apparatus, comprising:
an operation unit that inputs information regarding an operation of a user;
an imaging unit that images a subject to generate image data;
a file generation unit that generates an image file by adding, to the generated image data, a header part with at least one of plural pieces of search information for searching of the image data, the search information indicating one of first conditions and the search information being classified into predetermined categories based on second conditions, the search information including information indicating a shooting setting for the imaging apparatus for shooting an image via a shooting unit and generating the image data;

a recording unit that records generated image files to a first or a second recording medium; and a controller that controls generation and update of management data for managing the image files recorded on the first or the second recording medium, wherein at a timing of generating the image file by the file generation unit, the controller adds the file identification information for the generated image file to the management data, but does not add, to the management data, the search identification information indicating the search information regarding at least one piece of the search information that is stored during generation of the image file in the header part of the image file, and at a timing different from the timing of generating the image file by the file generation unit, the controller reads out the image file or the header part of the image file from the first or the second recording medium, and adds, to the management data, the search identification information indicating the at least one piece of search information when the at least one piece of search information is stored in the header part of the image file.

11. The imaging apparatus according to claim 10, wherein the plural pieces of search information and the predetermined categories are preset in the imaging apparatus.

12. An image search method for searching a recording medium for image files generated by an imaging apparatus which images a subject to generate an image file and records the generated image file on the recording medium, the method comprising:

storing with management data, file identification information for identifying an image file recorded on the recording medium, and search identification information indicating search information which indicates one of first conditions and is stored in a header part of the image file identified by the file identification information, with the file identification information associated with the search identification information, the search information including information indicating a shooting setting for the imaging apparatus for shooting an image via a shooting unit and generating the image data;

classifying the search information into predetermined categories based on second conditions and managing the classified search information;

receiving designation of a category as a search target; and with reference to the management data, identifying an image file related to the designation of a category among the image files stored in the recording medium, based on the file identification information associated with the search identification information indicating the search information that belongs to the designated category.

13. The image search method according to claim 12, wherein the plural pieces of search information and the predetermined categories are preset in the imaging apparatus.

14. An image search method for searching a recording medium for image files generated by an imaging apparatus which images a subject to generate an image file and records the generated image file on the recording medium, the method comprising:

storing with management data, file identification information for identifying an image file recorded on the recording medium, and search identification information indicating search information which indicates one of first conditions and is stored in header part of the image file identified by the file identification information, with the file identification information associated with the search identification information, the search information being classified into predetermined categories based on second conditions, the search information including information indicating a shooting setting for the imaging apparatus for shooting an image via a shooting unit and generating the image data; and at a timing of generating the image file by the file generation unit, adding the file identification information for the generated image file to the management data, while not adding, to the management data, the search identification information indicating the search information regarding at least one piece of the search information that is stored during generation of the image file in the header part of the image file; and at a timing different from the timing of generating the image file by the file generation unit, reading out the image file or the header part of the image file from the first or the second recording medium, and adding, to the management data, the search identification information indicating the at least one piece of search information when the at least one piece of search information is stored in the header part of the image file.

15. The image search method according to claim 14, wherein the plural pieces of search information and the predetermined categories are preset in the imaging apparatus.

* * * * *